(12) United States Patent
Guerra et al.

(10) Patent No.: US 11,907,178 B2
(45) Date of Patent: *Feb. 20, 2024

(54) SYSTEM AND METHOD OF PRESENTING A HYBRID CLOUD CACHE AS A FILE SYSTEM

(71) Applicant: Egnyte, Inc., Mountain View, CA (US)

(72) Inventors: Andrew Guerra, Mountain View, CA (US); Ajay Salpekar, Mountain View, CA (US); David Tang, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,264

(22) Filed: Jan. 25, 2023

(65) Prior Publication Data

US 2024/0004843 A1    Jan. 4, 2024

Related U.S. Application Data

(63) Continuation of application No. 17/333,696, filed on May 28, 2021, now Pat. No. 11,573,934.

(60) Provisional application No. 63/034,300, filed on Jun. 3, 2020.

(51) Int. Cl.
*G06F 16/188* (2019.01)
*G06F 16/16* (2019.01)

(52) U.S. Cl.
CPC .......... *G06F 16/196* (2019.01); *G06F 16/162* (2019.01); *G06F 16/166* (2019.01); *G06F 16/168* (2019.01)

(58) Field of Classification Search
CPC .... G06F 16/196; G06F 16/162; G06F 16/166; G06F 16/168
See application file for complete search history.

(56) References Cited

U.S. PATENT DOCUMENTS

| 10,740,287 | B2 * | 8/2020 | Haviv | G06F 3/0685 |
| 10,909,069 | B2 * | 2/2021 | Haviv | G06F 3/0649 |
| 11,444,925 | B1 * | 9/2022 | Patimer | H04L 67/147 |
| 2016/0162758 | A1 | 6/2016 | Prest | |
| 2016/0210044 | A1 | 7/2016 | Mitkar et al. | |
| 2019/0317849 | A1 * | 10/2019 | Cmielowski | G06F 11/0772 |
| 2020/0097847 | A1 * | 3/2020 | Convertino | G06F 11/3447 |
| 2020/0120153 | A1 | 4/2020 | Morgan et al. | |

* cited by examiner

*Primary Examiner* — Angelica Ruiz
(74) *Attorney, Agent, or Firm* — FisherBroyles LLP; Kevin D. Jablonski

(57) ABSTRACT

A system and methods for presenting a hybrid cloud cache as a file system. The system implements a set of standard file system command line interfaces that present the objects stored by the hybrid cloud cache to users of the system as if the users were viewing and interacting with a traditional file system. The system provides an interactive shell to the users to view the contents of the hybrid cloud cache. The system may be configured to operate on a live instance as well as on an on-disk structure of the hybrid cloud cache. The system may provide the ability to present partially cached cloud data as a file system via the interactive shell for the purposes of development, support, and troubleshooting.

20 Claims, 2 Drawing Sheets

SYSTEM AND METHOD OF PRESENTING A HYBRID CLOUD CACHE AS A FILE SYSTEM

CROSS REFERENCE TO RELATED APPLICATION

This application claims the benefit of U.S. Provisional Application No. 63/034,300, titled "System And Method Of Presenting A Hybrid Cloud Cache As A File System," filed Jun. 3, 2020, the disclosure of which is incorporated, in its entirety herein, by this reference.

FIELD OF THE DISCLOSURE

The present application relates to cloud technologies, data storage technologies, caching technologies, file system technologies, interface technologies, data consistency and integrity technologies, and more particularly, to a system and method for presenting a hybrid cloud cache as a file system.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be increased by implementing a journaling system, where a system adds records representing user requested transactions and the associated operations to a journal. Thus, the journaling system may be a data storage location where records are added to represent operations initiated by a user or by a computing system at the direction of a user, and the backing store for a journal may comprise disk blocks. Journals may also be referred to as logs and the two terms are often used interchangeably.

With the evolution of cloud-file-sharing technologies and the tremendous growth of data both in terms of the number of files and the sizes of the files, hybrid cloud caches and systems are becoming an increasingly important aspect in advancements in the cloud-file-sharing space. A hybrid cloud cache may offer a "window" or access node to a cloud-file-sharing system, while providing a user with performance capabilities as if the data was stored in a local data storage. In some scenarios, a local hybrid cloud cache may provide a partial copy of the data residing in a cloud-based platform, such as a public cloud. Even though the contents of the hybrid cloud cache may be presented as a file system to users, the contents and hybrid cloud cache conventionally do not comprise a file system themselves. This can present a challenge when it comes to investigating and remedying problems involving the operation of a hybrid cloud cache system both internally, as well as in the field, and is especially evident as problems are reported in reference to file system objects viewed by users.

Conventional approaches to solving the challenges associated with investigating and remedying problems involving the operation of a hybrid cloud cache system include utilizing virtual file systems and tools that read on-disk file system structures (e.g., fsdb, xfs repair) and presenting them in a desired format. While these approaches provide benefits and efficiencies, such technologies and methodologies still have shortcomings. Embodiments of the system, apparatuses, and methods described herein are directed to processes and techniques to overcome disadvantages associated with conventional approaches to providing users with tools to investigate and remedy operational problems of systems that include a hybrid cloud cache.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

A system and accompanying methods for presenting a hybrid cloud cache as a file system are disclosed. In particular, the system and methods comprise implementing a set of standard file system command line interfaces that enable presenting objects stored by a hybrid cloud cache to its users as if in a traditional file system. In some embodiments, these command line interfaces may include but are not limited to or required to include one or more of those commonly found in a computing system that utilizes a file system and enables a user to perform a set of functions on the file system and/or objects. For example, a conventional file system is part of an operating system and is generally (although not always completely) POSIX compliant (this refers to the Portable Operating System Interface standard). Command line interfaces (CLI) typically available with such systems may include "ls", "cd", "pwd", "cat" etc.

Additionally, the system and methods provide an interactive shell to users to enable users to view the contents of the hybrid cloud cache in the form of a traditional file system. In some embodiments, the interactive shell provided by the system and methods described herein may operate on a live instance, meaning when the hybrid cache cloud is online and active. In some embodiments, the interactive shell may also permit a user to view on-disk structures of the hybrid cloud cache. These are data and metadata stored by the cache and may be read by the shell in situations in which the hybrid cloud cache is offline. The functionality provided by the system and methods described provides the ability to present partially cached cloud data as a file system via an interactive shell for the purposes of development, support, and/or troubleshooting purposes.

In one embodiment, a system for presenting a hybrid cloud cache as a file system is provided. The system may include a set of computer-executable instructions (which may be stored in a memory element) and a processor that executes the instructions, wherein when executed, the instructions cause the processor (or a system or apparatus in which it is contained) to perform various operations. The operations may comprise:

implementing one or more command line interfaces accessible to a user by an interactive shell, wherein each of the command line interfaces corresponds to an operation that may be performed on a hybrid cloud cache or on an object in the hybrid cloud cache;
  in some embodiments, the command line interfaces may be implemented as Python functions, although other languages may be used;
  the interactive shell uses REST APIs and/or reads on-disk structures using the interfaces;
enabling a user to view contents of the hybrid cloud cache via the interactive shell; and
enabling a user to execute one or more operations or functions on a selected object in the contents of the hybrid cloud cache, where such operations or functions may include;
  execution of a cache flush;
  visibility of objects that cannot be pushed to cloud;
  upload files;
  viewing of cache metadata;
  create folders;
  rename folders and files; and
  delete folders and files.

In another embodiment, a method for presenting a hybrid cloud cache as a file system is provided. The method may include:
implementing one or more command line interfaces accessible to a user by an interactive shell, wherein each of the command line interfaces corresponds to an operation that may be performed on a hybrid cloud cache or on an object in the hybrid cloud cache;
  in some embodiments, the command line interfaces may be implemented as Python functions, although other languages may be used;
  the interactive shell uses REST APIs and/or reads on-disk structures using the interfaces;
enabling a user to view contents of the hybrid cloud cache via the interactive shell; and
enabling a user to execute one or more operations or functions on a selected object in the contents of the hybrid cloud cache, where such operations or functions may include;
  execution of a cache flush;
  visibility of objects that cannot be pushed to cloud;
  upload files;
  viewing of cache metadata;
  create folders;
  rename folders and files; and
  delete folders and files.

According to yet another embodiment, a set of computer-executable instructions for presenting a hybrid cloud cache as a file system is provided. The computer instructions, when executed by a processor or processors, may cause the processor or processors to perform one or more operations including:
implementing one or more command line interfaces accessible to a user by an interactive shell, wherein each of the command line interfaces corresponds to an operation that may be performed on a hybrid cloud cache or on an object in the hybrid cloud cache;
  in some embodiments, the command line interfaces may be implemented as Python functions, although other languages may be used;
  the interactive shell uses REST APIs and/or reads on-disk structures using the interfaces;
enabling a user to view contents of the hybrid cloud cache via the interactive shell; and
enabling a user to execute one or more operations or functions on a selected object in the contents of the hybrid cloud cache, where such operations or functions may include;
  execution of a cache flush;
  visibility of objects that cannot be pushed to cloud;
  upload files;
  viewing of cache metadata;
  create folders;
  rename folders and files; and
  delete folders and files.

These and other features of the systems and methods for presenting a hybrid cloud cache as a file system are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

DETAILED DESCRIPTION

Figure 1:
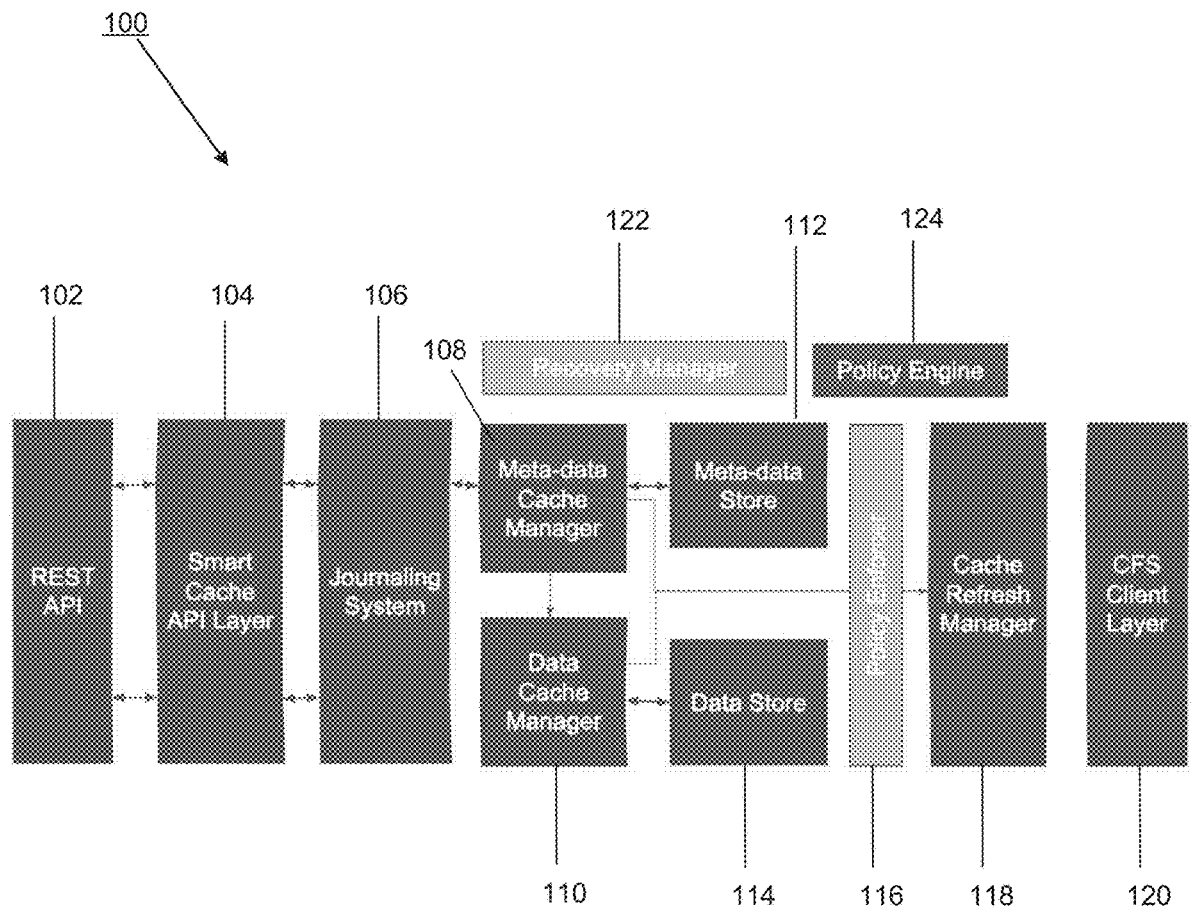
FIG. 1 is a schematic diagram illustrating a system including components for presenting a hybrid cloud cache as a file system, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

A system and accompanying methods for presenting a hybrid cloud cache as a file system are disclosed. In particular, the system and methods comprise implementing a set of standard file system command line interfaces that present objects stored by a hybrid cloud cache to a user as if using a traditional file system. Additionally, the system and methods present an interactive shell to a user to enable the user to view the contents of the hybrid cloud cache as with a traditional file system. In some embodiments, the interactive shell provided by the system and methods may operate on a live instance. In some embodiments, the interactive shell may also operate on on-disk structures of the hybrid cloud cache. Further, the functionality and capabilities provided by the system and methods described herein provides the ability to present partially cached cloud data as a file system via an interactive shell for the purposes of development, support, and/or troubleshooting purposes.

As mentioned, in some embodiments, an interactive shell is implemented in a system that includes a hybrid cloud cache. The interactive shell may include one or more command line interfaces (CLI), with those interfaces implemented as Python functions, or using another suitable language. Examples of the implemented CLIs include but are not limited to or required to include "ls", "cd", "pwd", "cat", etc. In some embodiments, when the hybrid cloud cache is running/active (i.e., there is a live instance and the cache is online), the Python functions communicate with the hybrid cloud cache via REST APIs to perform the expected functionality of the appropriate CLI. When the hybrid cloud cache is not running (i.e., not active and offline), these functions instead use a mechanism involving reading on-disk (raw) information (which can also be referred to as the metadata and data stored on a disk by the hybrid cloud cache) to provide the expected functionality.

As a non-limiting example, the table below provides a list of a set of possible CLIs in terms of the command, the online and offline endpoint, and the function implemented:

| Command | Online Implementation | Offline Implementation | Description |
|---|---|---|---|
| pwd | Display users current working directory from in-memory data structure | Display users current working directory from in-memory data structure | Display the current working directory |
| cd | Update in-memory data structure to reflect the new location as the current working directory | Update in-memory data structure to reflect the new location as the current working directory | Change user's current working directory |
| ls | Display the listing details of requested objects from Hybrid Cloud Cache via /scache/private/v1/fsi endpoint | Display the listing details of requested objects by reading the metadata from on-disk structures | 1. Display contents of directory 2. Display basic metadata of file |
| stat | Display the stat details of requested objects from Hybrid Cloud Cache via /scache/private/v1/fsi endpoint | Display the stat details of requested objects by reading the metadata from on-disk structures | Display stat detail of file |
| find | Display full path of all the objects that match the specified name by recursive use of /scache/private/v1/fsi endpoint for the whole namespace. | Display full path of all the objects that match the specified name by recursive walk of metadata from on-disk structures. | Given a name of a file or directory, display the full path of all the matches. |
| get version | Display the Hybrid Cloud Cache version via /scache/private/v1/GetVersion endpoint. | Not supported in offline mode. | Provides overall information about Smart Cache such as version, mode, status etc. |

As shown in FIG. 1, a system for presenting a hybrid cloud cache as a file system is disclosed. The system 100 may be configured to support, but is not limited to supporting, caching services, services for facilitating creation and/or operation of an interactive shell, file system services, hybrid cloud services, cloud services, transaction system services, transaction conversion services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and any other computing applications and services. In certain embodiments, the system 100 may be included within another system, may be a separate system from another system, and/or may be a subsystem of another system.

The system 100 may include, but is not limited to including, a REST Application Programming Interface (API) 102 (or other API), a smart cache API layer 104 (or other API layer), a journaling system 106 (which may include a number of journals), a metadata cache manager 108, a data cache manager 110, a metadata store 112, a data store 114, a policy enforcer 116, a cache refresh manager 118, a cloud-file-storage (CFS) client layer 120, a recovery manager 122, and a policy engine 124. The system 100 may include a hybrid cloud cache that may utilize the various components of the system 100 and may communicatively link and upload data to and/or download data from a cloud system. The REST API 102 may serve as the interface between user devices and/or other devices and applications supporting the functionality of the system 100. The REST API 102 may be configured to receive API calls from clients (e.g., to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components and/or applications of the system 100.

The journaling system 106 may include a number of journals. One or more of the journals may be configured to record operations (including data and metadata associated with the operations). The metadata may be information that describes the data and/or operations and what is in the data and/or the type of operation. In some embodiments, the journals may be a circular log, buffer, and/or other data structure. In some embodiments, the journals may transfer records storing information associated with the operations to the cloud (i.e., to a cloud-based platform or system). Once the records are transferred to the cloud, the records may be deleted or overwritten on the journal(s). The journal(s) may be utilized to ensure that the operations requested by clients are carried out and performed, even if the system 100 crashes or suffers another type of interruption. Data and metadata associated with the operations may be managed by the data cache manager 110 and the metadata cache manager 108 respectively. In certain embodiments, the records including the data and metadata may be stored in the data store 114 and the metadata store 112 respectively.

The system 100 may include a policy enforcer 116, which may be configured to enforce the policies and rules associated with the system 100. The cache refresh manager 118 may be configured to refresh a cache in the system 100. For example, the cache refresh manager 118 may be configured to ensure that data and/or metadata recently stored in a particular cache is current and/or accurate. The system 100 may also include a cloud-file-storage system client layer 120, which may be utilized to facilitate the providing of the records associated with the operations from the journal(s) to a cloud-file-storage system (e.g., a cloud-based platform). Additionally, the system 100 may include a recovery manager 122, which may be configured to recover lost data and/or metadata and ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:
 a) Storage Management policies (e.g., how much disk space should be used by the cache);
 b) Caching policies—what should be cached, what part of cache should be updated and when; and
 c) Eviction policies—What should be evicted/removed from cache if there is a need to do so.

In some embodiments, one or more policies may be implemented in whole or in part by a rule-based, a trained machine learning model, or other decision process.

In some embodiments, the system 100 may implement a set of file system command line interfaces to facilitate the generation and functionality of an interactive shell for use with a hybrid cloud cache. By utilizing the interactive shell, the system 100 may present an object stored by the hybrid cloud cache in a manner such that the interactive shell is perceived as a traditional file system to a user and/or user device. The interactive shell of the system 100 may enable a user to view contents of the hybrid cloud cache as well. In some embodiments, the interactive shell may operate on a live instance and/or on an on-disk structure of the hybrid cloud cache itself. The interactive shell may provide the ability to present partially cached cloud data as a file system for the purposes of development, support, and/or troubleshooting.

In some embodiments, the interactive shell may include a graphical user interface that displays various functional features of the interactive shell, and which may be configured to receive commands from a user and/or user device to determine one or more of status information associated with content to be uploaded to the cloud or the contents of the cache, to perform a variety of actions with respect to the content, and/or to perform other desired operations. In some embodiments, the interactive shell may utilize standard command system interfaces instead of custom-tailored commands. This capability is in contrast to conventional approaches and technologies, which typically utilize their own syntax.

Example standard commands may include find commands for locating files, commands for navigating the information provided via the interactive shell in a manner similar to navigating a traditional file system, and other functions or operations typically found in a standard file system. In some embodiments, the interactive shell may be built as part of the hybrid cloud cache container (e.g., a smart cache file system or SCFS). In some embodiments, in order to execute the interactive shell, a user and/or the system 100 may execute a binary function and hit enter, which may prompt the user to enter a username and password to authenticate, access, and/or interact with the interactive shell as if it is a file system. In some embodiments, the interactive shell may be configured to support read-only operations, such as requesting and/or accessing names of files, information about files, status information about files, other information describing files, or a combination thereof. In some embodiments, a user may have support for write operations well.

In an example use-case, a user may indicate that she/he uploaded a file to a desktop application, but they do not see that the uploaded file is in the cloud. The interactive shell may enable the user to execute an "ls" command on the full path of the file to see if it exists. If the file does exist, a "stat" command may be executed on the file to see if the file has been pushed to the cloud (and therefore is present on the cloud-based platform) from the hybrid cloud cache or from another location. In another example use-case, a user may indicate that she/he cannot find a file that they uploaded to the desktop application. In this instance, the user may run a "find" command via the interactive shell to determine where the file is currently residing.

In another example use-case, the system may indicate that files are not being uploaded to the cloud, but the user is not receiving error messages when uploading the files to the desktop application. In such a scenario, the interactive shell (e.g., the smart cache file system described herein) may be used to determine if the hybrid cloud cache is in an online state or in an offline state (or mode). In some embodiments, the offline or online state may be determined when the user is authenticated when attempting to access the interactive shell itself.

In another example use-case, the hybrid cloud cache may be encountering authorization issues, such as when a security certificate has expired. In such a situation, the interactive shell may be utilized to execute a "get version" command to determine if the hybrid cloud cache is properly authorized. In another use-case, a dashboard monitor for the system 100 (such as a log-based monitoring tool) may be showing consistent heartbeat issues in a situation in which it is unclear if the issue is a heartbeat issue or a logging issue. In this situation, the interactive shell may be utilized to execute a "get version" command to determine if the hybrid cloud cache is online. In a further use-case a user may be experiencing an issue that has been fixed in a later release. In this case, the interactive shell may be utilized to execute a "get version" command to determine if the hybrid cloud cache is using the most recent release (e.g., perform a cross-check git hash and version).

In some embodiments, other uses and benefits may be obtained. The interactive shell and functionality provided by the system 100 may be utilized to push individual files to the cloud. The user may be able to perform troubleshooting and may upload desired files to the cloud interactively by utilizing the interactive shell. In another use-case, the interactive shell and functionality provided by the system 100 may be utilized for cache flushing. In the case of a malfunction or before re-deploying the hybrid cloud cache, a cache-flush operation may be utilized to "push" all "dirty" cache contents to the cloud (where a cache is considered "dirty" when it has modifications (via Explicit transactions) that have not yet been pushed to the cloud).

The interactive shell and functionality of the system 100 may also be utilized to conduct lost and found operations. The hybrid cloud cache may have a location named Lost+Found, which may be dedicated to preserve objects (e.g., files and folders) that could not be pushed to the cloud for various reasons. The functionality of the interactive shell may be extended to provide visibility to such objects and to allow users to push these objects to the cloud. In some embodiments, these objects can be pushed to the cloud only after rectifying the error that was the cause of an unsuccessful push operation.

In some embodiments, the interactive shell may be configured to perform "purgatory" operations. In such a scenario, the hybrid cloud cache may include a purgatory section, where deleted objects are preserved until they are no longer referenced by pending operations.

The functionality of the interactive shell may be extended to provide visibility to the user into the contents of the purgatory and the ability to restore (or un-delete) the contents in some situations. In some embodiments, the interactive shell and hybrid cloud cache may be utilized to perform other types of operations on the cache contents. For example, the interactive shell may be utilized to view cache metadata (e.g., object names and attributes), and the interactive shell functionality may be extended to allow other types of operations after authentication is successful, where such other types of operations may include file-upload, create-folder, rename file/folder, delete file/folder, and/or other types of operations.

Still further, the interactive shell and/or hybrid cloud cache may be utilized to facilitate direct access to cloud contents. The functionality of the interactive shell may be extended to provide direct access to cloud contents without using the hybrid cloud cache as an intermediary between the user and the cloud. In some embodiments, this kind of access may be made available in situations where other ways of accessing cloud contents are not possible or practical.

Figure 2:
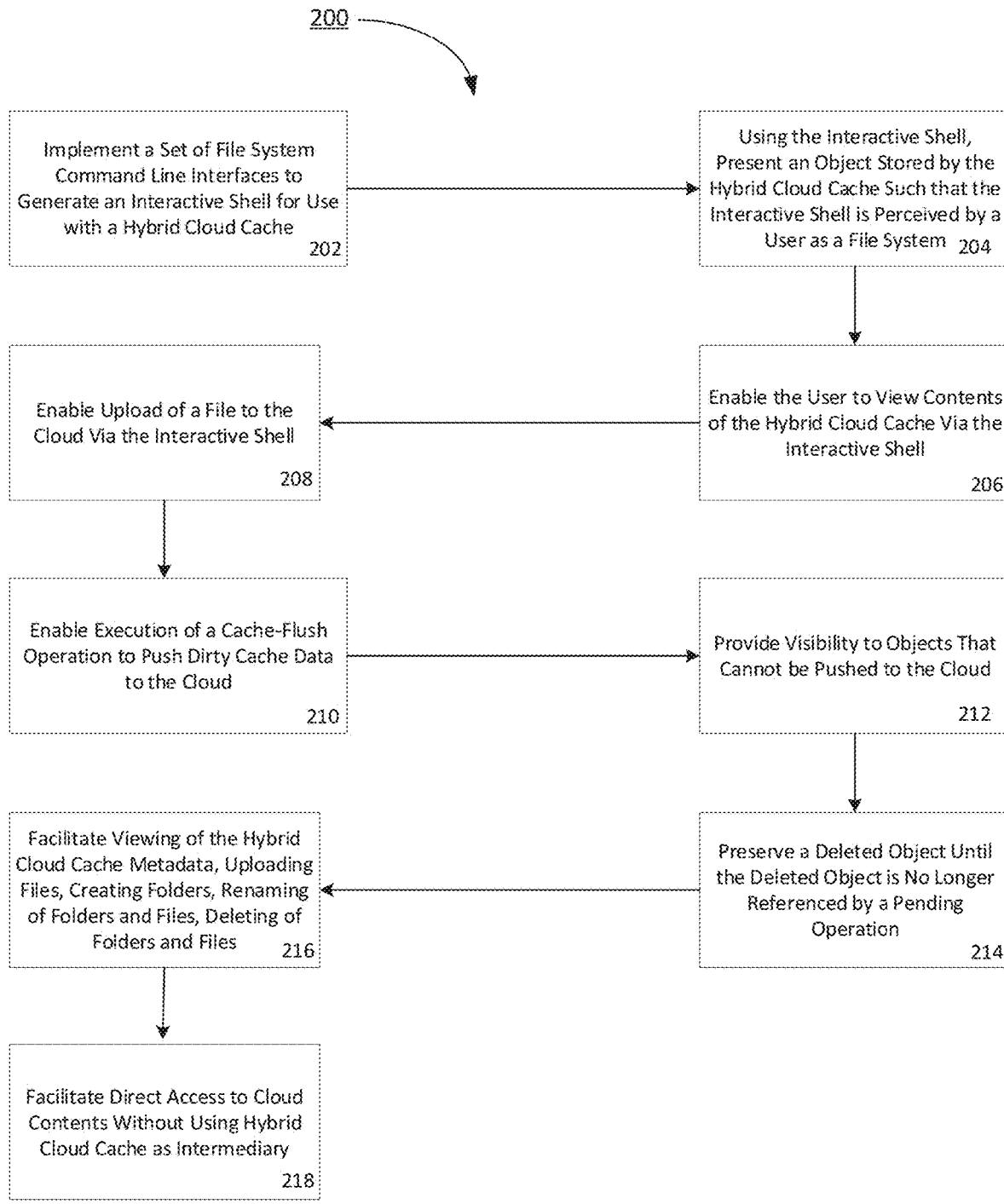
FIG. 2 is a flow chart or flow diagram illustrating an example process, operation, method, or function for presenting a hybrid cloud cache as a file system, in accordance with some embodiments.

A combination of the components, devices, programs, and/or networks of the system 100 may be used to execute and/or conduct the functionality as described in the method(s) that follow and with reference to FIG. 2, which is a flow chart or flow diagram illustrating an example process, operation, method, or function for presenting a hybrid cloud cache as a file system, in accordance with some embodiments. In some embodiments, the steps or stages of the method 200 may be conducted in a desired sequence. In some embodiments, certain steps of the method 200 may be optional.

In an example embodiment, the method 200 may proceed as follows:

At step 202, the method 200 may include implementing a set of file system command line interfaces to generate an interactive shell for use with a hybrid cloud cache;

In some embodiments, the interactive shell may comprise software, hardware, or a combination of hardware and software. The interactive shell may be implemented by a processor executing a set of computer-executable instructions in the form of a software program;

At step 204, the method 200 may include presenting, such as by utilizing the interactive shell, an object stored by the hybrid cloud cache in a manner such that the interactive shell is perceived as a file system to a user and/or user device;

This may mean that an object stored in the cache is presented in a form and displayed as if presented by a conventional file system, with the shell allowing selection and expansion of folders, selection of files, examination of files, etc.;

At step 206, the method 200 may include enabling a user to view contents of the hybrid cloud cache via the interactive shell;

This may mean allowing the user to view a set of objects in the cache using the shell with the view being of the form used to display objects by a file system (folders, files, documents, objects, etc.);

The interactive shell will also provide tools to allow a user to perform certain operations on a selected object using a command line interface (CLI) as described herein;

As an example, at step 208, the method 200 may include enabling and/or facilitating upload of a file to a cloud via the interactive shell associated with the hybrid cloud cache;

This may include allowing a user to select a file as an object to operate on, and initiating a file upload operation to upload the selected file to a cloud-based platform;

At step 210, the method 200 may include enabling operation of a cache-flush operation to push dirty cache data to the cloud;

This may include allowing a user to initiate an operation to process one or more unprocessed (unexecuted) Explicit transactions;

At step 212, the method 200 may include providing visibility to objects in the hybrid cloud cache that cannot be pushed to the cloud;

This may include allowing a user to view one or more objects that could not successfully be pushed to the cloud due to a failure to perform an upload operation by executing a corresponding transaction;

At step 214, the method 200 may include preserving a deleted object until the deleted object is no longer referenced by a pending operation/transaction of the user, the hybrid cloud cache, or a combination thereof;

At step 216, the method 200 may include facilitating viewing of cache metadata (e.g., information describing characteristics of data and/or content in the cache), enabling a user to perform an operation such as uploading a file to the cache, creating a file, renaming a file and/or folder, deleting a file and/or folder, or a combination thereof (some of which are operations that create metadata or modify existing metadata);

At step 218, the method 200 may include facilitating direct access to the contents of a cloud-based platform without using the hybrid cloud cache as an intermediary to the cloud;

This enables a user to directly access the contents of a cloud-based platform using the interactive shell, and may be used when other methods of accessing the contents of the cloud-based platform are unavailable (such as if the hybrid cloud cache is offline or is not able to authenticate a user);

As an example—a user reports that they are unable to see a specific object (file/folder) when connected to a Hybrid Cloud Cache. In this situation, a support/IT person can use the interactive shell to directly access the cloud and check for the existence of the object in the cloud. Although this is one example, there are other situations where direct access to cloud would be useful and convenient to diagnose and/or resolve problems, evaluate the result of implementing a new command or process, etc.

The method 200 may continuously operate as additional transactions, requests, and/or commands are received and/or processed by the system 200. Further, in certain embodiments, upon activation of the interactive shell in the system 200, the steps of the method 200 may be conducted in a desired order and certain steps may be omitted, repeated, modified, and/or made optional as desired. Moreover, the method 200 may further incorporate features and functionality described for the system 100, another method disclosed herein, or as otherwise described herein.

Further examples of the functions and capabilities that may be provided by an embodiment of the interactive shell and file system command line interfaces described herein are presented below in the form of a non-limiting list of situations in which a user might use the system and methods:

Use Case 1
Problem—User says they uploaded a file to the Desktop App but does not see it in the cloud.
Solution—Do "ls" on full path of file to see if it exists. If it does, can do "stat" on file to see if it has made it to the cloud yet.

Use Case 2
Problem—User says they cannot find a file they just uploaded to the Desktop App.
Solution—Run "find" on filename to determine where the file might reside.

Use Case 3
Problem—User says that files are not being uploaded to the cloud, but they are not getting errors when uploading the files to the Desktop App.
Solution—Boot up the interactive shell (SCFS) to see if the Hybrid Cloud Cache is in "online" or "offline" mode (this will be made clear as soon as logging into the SCFS).

Use Case 4
Problem—Hybrid Cloud Cache is running into authorization issues, for example a security certificate may have expired.
Solution—Run "get_version" to see if the Hybrid Cloud Cache is properly authorized. The shell, when invoked, attempts to communicate with the Hybrid Cloud Cache using a "GetVersion" REST API. If the Hybrid Cloud Cache is running, then the response from the Hybrid Cloud Cache indicates if it is properly authorized, where here "properly authorized" means it has been configured correctly and the credentials of the admin user (of the Hybrid Cloud Cache) have been verified with the Cloud.

Use Case 5
Problem—Dashboard Monitor is showing consistent heartbeat issues, but it is unclear whether it is a heartbeat issue or a logging issue.
Solution—Run "get_version" to see if Hybrid Cloud Cache is online.

Use Case 6
Problem—Users running into an issue that has been fixed in a later release.
Solution—Run "get_version" to make sure the Hybrid Cloud Cache is using the most recent release (cross-check git hash and version).

Other use cases or scenarios for the described system and methods may include:

Push Individual Files to cloud—on occasions, a user may be able to perform basic troubleshooting and upload desired files to the cloud interactively;

Cache flush—in case of a malfunction or before re-deploying the Hybrid Cloud Cache, a cache-flush operation can be used to push all dirty cache to the cloud;

LOST and FOUND Operations—the Hybrid Cloud Cache may include a location named lost+found, dedicated to preserving objects (files and folders) that could not be pushed to the cloud. The SCFS can be extended to provide visibility to such objects and to allow a fresh cloud-push operation. The fresh cloud-push can be performed after rectifying the error that was the cause of an unsuccessful push;

Purgatory Operations—the Hybrid Cloud Cache may include a purgatory, where deleted objects are preserved until they are no longer referenced by a pending operation/transaction. The SCFS can be extended to provide visibility to a user into the contents of the purgatory and also the ability to restore (or un-delete) objects when possible;

Perform Operations on Cache Contents—the interactive shell can be used to view the cache metadata (object names and attributes), and may be extended to allow access to other data and enable other operations (such as file-upload, create-folder, rename file/folder, delete file/folder) after appropriate authentication; and Direct Access to Cloud Contents—the SCFS can be extended to provide direct access to the cloud contents without using Hybrid Cloud Cache as an intermediary. This type of access may be desirable in situations where the preferred ways of accessing the cloud contents are not available.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the system and methods described. Combinations of the above arrangements, and other arrangements not specifically described herein, will be apparent to those of skill in the art upon reviewing the above description. Therefore, it is intended that the disclosure not be limited to the particular arrangement(s) or embodiments disclosed, but include all embodiments and arrangements falling within the scope of the appended claims.

The foregoing is provided for purposes of illustrating, explaining, and describing one or more embodiments of the disclosure. Modifications and adaptations to these embodiments will be apparent to those skilled in the art and may be made without departing from the scope or spirit of this invention. Upon reviewing the embodiments, it would be evident to an artisan with ordinary skill in the art that said embodiments can be modified, reduced, or enhanced without departing from the scope and spirit of the claims described below.

What is claimed is:

1. A computing device, comprising:
    an electronic processor or processors configured to execute an interactive shell at the computing device, the interactive shell in communication with a remote hybrid cloud cache;
    a non-transitory data storage element;
    a set of computer-executable instructions stored in the data storage element; and
    a display coupled to the electronic processor or processors and configured to display the interactive shell;
    wherein when the processor or processors execute the set of computer-executable instructions cause the processor or processors to perform operations comprising:
        implementing one or more command line interfaces presented through the interactive shell, wherein each of the command line interfaces corresponds to an operation executable on the hybrid cloud cache or on an object in the hybrid cloud cache;
        presenting a set of objects in the interactive shell;
        receiving a selection of an object from the set of objects;
        receiving an input of a command line interface to the interactive shell; and
        executing the operation corresponding to the input command line interface on the selected object at the hybrid cloud cache.

2. The computing device of claim 1, wherein the set of computer-executable instructions further comprise computer-executable instructions that cause the processor or processors to present cloud objects cached in the hybrid cloud cache on the display as part of an interactive shell file system.

3. The computing device of claim 1, wherein the operation is one of:
    execution of a cache flush;
    viewing objects that cannot be pushed to cloud;
    uploading a file;
    viewing cache metadata;
    creating a folder;
    renaming a folder or file; and
    deleting a folder or file.

4. The computing device of claim 1, wherein the interactive shell remotely interacts with a live instance of the hybrid cloud cache.

5. The computing device of claim 1, wherein the interactive shell operates on an on-disk structure of the hybrid cloud cache stored in a data element at a remote server computer.

6. The computing device of claim 1, wherein the set of computer-executable instructions further comprise instructions that cause the processor or processors to enable a command to be executed via the interactive shell to determine whether the object has been uploaded to a cloud.

7. The computing device of claim 1, wherein the set of computer-executable instructions further comprise instructions that cause the processor or processors to enable a command to be executed via the interactive shell to determine a location of the object.

8. The computing device of claim 1, wherein the set of computer-executable instructions further cause the processor or processors to determine if the hybrid cloud cache is in an offline state or an online state when booting up the interactive shell.

9. The computing device of claim 1, wherein the set of computer-executable instructions further cause the processor or processors to execute the interactive shell to determine that the hybrid cloud cache is authorized.

10. The computing device of claim 1, wherein the set of computer-executable instructions further cause the processor or processors to execute the interactive shell to determine that the hybrid cloud cache is a current version of the hybrid cloud cache.

11. A computer-implemented method, comprising:
    executing an interactive shell at a computing device remote from a server computer engaging a hybrid cloud cache;
    implementing one or more command line interfaces accessible by the interactive shell, wherein each of the command line interfaces corresponds to an operation that is operable on a hybrid cloud cache or on an object in the hybrid cloud cache;
    presenting a set of objects at the interactive shell;
    receiving a selection of an object from the set of objects;
    receiving an input of a command line interface to the interactive shell; and
    executing the operation corresponding to the input command line interface on the selected object.

12. The method of claim 11, wherein the operation is one of:
    execution of a cache flush;
    viewing objects that cannot be pushed to cloud;
    uploading a file;
    viewing cache metadata;
    creating a folder;
    renaming a folder or file; and
    deleting a folder or file.

13. The method of claim 11, wherein the set of command line interfaces comprises one or more of pwd, cd, ls, stat, find, and get_version.

14. The method of claim 11, further comprising determining that the hybrid cloud cache is in an offline state.

15. The method of claim 11, further comprising determining that the hybrid cloud cache is properly authorized.

16. The method of claim 11, further comprising:
executing a file system at the computing device; and
presenting cloud objects cached in the hybrid cloud cache as part of the file system.

17. The method of claim 11, further comprising executing the interactive shell as an intermediary between contents of the hybrid cloud cache and a remote user computing device.

18. A non-transitory data storage element including a set of computer-executable instructions, which when executed by an electronic processor or processors, cause the processor or processors to perform operations comprising:
implementing one or more command line interfaces presented through a local interactive shell, wherein each of the command line interfaces corresponds to an operation executable on a remote hybrid cloud cache or on an object in the hybrid cloud cache;
presenting a set of objects in the local interactive shell;
locally receiving a selection of an object from the set of objects;
locally receiving an input of a command line interface to the interactive shell; and
remotely executing the operation corresponding to the input command line interface on the selected object at the hybrid cloud cache.

19. The non-transitory data storage element of claim 18, wherein the operation is one of the group composed of:
execution of a cache flush;
viewing objects that cannot be pushed to cloud;
uploading a file;
viewing cache metadata;
creating a folder;
renaming a folder or file; and
deleting a folder or file.

20. The non-transitory data storage element of claim 18, wherein the interactive shell is instantiated locally in response to a remotely received request.

* * * * *